(12) United States Patent
Miyazaki

(10) Patent No.: US 12,055,176 B2
(45) Date of Patent: Aug. 6, 2024

(54) BOLT

(71) Applicant: AOYAMA SEISAKUSHO CO., LTD., Niwa-Gun (JP)

(72) Inventor: Gentaro Miyazaki, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 317 days.

(21) Appl. No.: 17/452,097

(22) Filed: Oct. 25, 2021

(65) Prior Publication Data

US 2022/0042541 A1 Feb. 10, 2022

Related U.S. Application Data

(63) Continuation of application No. PCT/JP2021/014112, filed on Apr. 1, 2021.

(30) Foreign Application Priority Data

Apr. 8, 2020 (JP) .................................. 2020-069704

(51) Int. Cl.
*F16B 39/30* (2006.01)
(52) U.S. Cl.
CPC .................... *F16B 39/30* (2013.01)
(58) Field of Classification Search
CPC ............................ F16B 39/30; F16B 2200/93
USPC .................................................. 411/311, 420
See application file for complete search history.

(56) References Cited

U.S. PATENT DOCUMENTS

| | | | | |
|---|---|---|---|---|
| 2,177,005 A | * | 10/1939 | Purtell | F16B 39/30 411/311 |
| 3,076,208 A | * | 2/1963 | Moore | B21K 1/46 411/311 |
| 3,520,344 A | * | 7/1970 | Gabbey | B21H 3/00 470/9 |
| 5,340,254 A | * | 8/1994 | Hertel | F16B 25/0021 411/311 |

(Continued)

FOREIGN PATENT DOCUMENTS

| EP | 2 696 084 A1 | 2/2014 |
|---|---|---|
| JP | 2000-074027 A | 3/2000 |

(Continued)

OTHER PUBLICATIONS

Indian Office Action dated Nov. 10, 2022 (Application No. 202127052549).

(Continued)

*Primary Examiner* — Flemming Saether
(74) *Attorney, Agent, or Firm* — BURR PATENT LAW, PLLC

(57) ABSTRACT

Provided is an invention relating to a bolt having a crushed portion of a ridge formed on a regular threaded portion of the bolt. The crushed portion of the ridge is set to have a height at which no screwing torque is generated when the bolt is screwed into an internal thread, and the crushed portion of the ridge is formed on an entire half-circumference or a partial half-circumference of the regular threaded portion so as to form a spiral shape that advances toward a shaft tip in a direction opposite to the ridge of the regular threaded portion when viewed from a head. The bolt of the present invention is used as a locking bolt or an earth bolt.

4 Claims, 5 Drawing Sheets

(56) References Cited

U.S. PATENT DOCUMENTS

| | | | | |
|---|---|---|---|---|
| 6,135,689 | A * | 10/2000 | Matsunami | F16B 39/30 411/311 |
| 6,863,483 | B2 * | 3/2005 | Koenig | F16B 39/30 411/311 |
| 8,858,142 | B2 * | 10/2014 | Suzuki | F16B 33/02 411/184 |
| 9,719,549 | B2 | 8/2017 | Kondo | |
| 9,903,405 | B2 | 2/2018 | Fujimoto et al. | |
| 2016/0091012 | A1 | 3/2016 | Kondo | |
| 2019/0063487 | A1 | 2/2019 | Ikami et al. | |
| 2022/0128082 | A1 * | 4/2022 | Mori | F16B 33/02 |

FOREIGN PATENT DOCUMENTS

| | | |
|---|---|---|
| JP | 3194854 U | 12/2014 |
| JP | 2015-187493 A | 10/2015 |
| JP | 2017-219076 A | 12/2017 |
| JP | 6263751 B2 | 1/2018 |

OTHER PUBLICATIONS

International Search Report and Written Opinion (Application No. PCT/JP2021/014112) dated Jun. 14, 2021.

* cited by examiner

D : MAJOR DIAMETER OF INTERNAL THREAD
    (NOMINAL DIAMETER)
d : MAJOR DIAMETER OF EXTERNAL THREAD
    (NOMINAL DIAMETER)
$D_2$ : PITCH DIAMETER OF INTERNAL THREAD
$d_2$ : PITCH DIAMETER OF EXTERNAL THREAD
$D_1$ : MAJOR DIAMETER OF INTERNAL THREAD
$d_1$ : MINOR DIAMETER OF EXTERNAL THREAD
H : HEIGHT OF FUNDAMENTAL TRIANGLE
P : PITCH

BOLT

BACKGROUND OF THE INVENTION

1. Field of the Invention

The present invention relates to a bolt having a crushed portion of a ridge formed on a regular threaded portion of the bolt.

2. Description of Relate Art

In the past, many locking bolts have been known which prevent loosening by crushing tops of ridges in regular threaded portions of the bolts to bulge flank surfaces, so that the bulges interfere with flank surfaces of internal threads.

For example, Patent Literature 1 describes a locking bolt in which crushed portions of ridges are formed on the peripheral surface of a regular threaded portion into a spiral shape with four threads. As shown in FIGS. 7 and 8 of Patent Literature 1, a bulge formed on the top of the ridge has a structure for preventing loosening by interfering with a flank surface of an internal thread.

Patent Literature 2 also describes a locking bolt in which crushed portions of ridges are formed on the peripheral surface of a regular threaded portion into a spiral shape with a plurality of threads. The crushed portion of Patent Literature 2 also has a structure for preventing loosening by interfering with a flank surface of an internal thread as shown in FIG. 3 thereof.

The crushing amount of the ridge in such conventional locking bolts is a volume in which the bulge generated by crushing interferes with both a pressure flank surface and a clearance flank surface of the internal thread. Therefore, it becomes a resistance when the bolt is screwed in, which increases the screwing torque as compared with a normal bolt. For this reason, it is not possible to seat the bolt at a target torque in a section used at low torque, and the bolt may not be securely fastened. In addition, since the bulge is large, it interferes with the internal thread, and after the bolt is seated, the bulge bites into the flank surface of the internal thread, which has caused a problem that the flank surface of the internal thread is greatly damaged.

CITATION LIST

Patent Literature

[PTL 1]

Utility Model Registration No. 3194854

[PTL 2]

Japanese Patent No. 6263751

SUMMARY OF THE INVENTION

Therefore, an object of the present invention is to solve the above-mentioned conventional problems, and to provide a novel bolt that can provide a loosening prevention effect or a conductive effect without increasing a screwing torque nor significantly damaging a flank surface of an internal thread.

The present invention made to solve the above-mentioned problems is a bolt having a crushed portion of a ridge formed on a regular threaded portion of a right-hand threaded bolt, in which the crushed portion of the ridge is set to have a height at which no screwing torque is generated when the bolt is screwed into an internal thread, and the crushed portion of the ridge is formed on the entire half-circumference or a partial half-circumference of the regular threaded portion so as to form a spiral shape that advances toward the shaft tip in a direction opposite to the ridge of the regular threaded portion when viewed from the head. Here, the partial half-circumference of the regular threaded portion means not the entire area of the regular threaded portion but half of the circumference of a part or an intermittent portion of the regular threaded portion.

In a preferred embodiment, the crushing amount of the ridge is from 7 to 22.5% of ⅝H according to JIS B0205-1 (ISO68-1), and the crushed portion of the ridge is formed only in a single thread on the entire half-circumference of the regular threaded portion so as to form a spiral shape that advances counterclockwise toward the shaft tip when viewed from the head. Further, the crushed portion of the ridge has a size such that when the bolt is screwed into an internal thread, only a bulge of a clearance flank surface comes into contact with the flank surface of the internal thread. The bolt of the present invention can produce a loosening prevention effect or a conductive effect by the crushed portion of the ridge.

The bolt of the present invention is the same as the conventional one in that a crushed portion of a ridge is formed in the regular threaded portion, but the crushing amount of the ridge is set to a height at which no screwing torque is generated when the bolt is screwed into the internal thread, specifically, from 7 to 22.5% of ⅝H according to JIS B 0205-1 (ISO 68-1), so that the formed bulge is reduced to a very small size. For this reason, when the bolt is screwed in, the bulge formed on the clearance flank surface of the ridge simply interferes with the flank surface of the internal thread, and the bulge on the opposite side has a margin between the bulge and the flank surface of the internal thread, so that unlike the conventional locking bolt, the screwing torque is not increased and the flank surface of the internal thread is not significantly damaged.

In addition, since the crushed portion of the ridge is formed only in a single thread on the entire half-circumference or partial half-circumference of the regular threaded portion so as to form a spiral shape that advances counterclockwise toward the shaft tip when viewed from the head, when the bolt is seated, the bulge formed on the flank surface of the bolt then bites into the internal thread. There is a clearance between the bolt and the internal thread, so that when a vibration load is applied in a direction perpendicular to the axis of the bolt, the bolt behaves as if it turns its head while slightly tilting around the biting bulge and gradually rotates to the right. Therefore, the bolt of the present invention has an effect of tightening itself when subjected to vibration. This effect will be described later.

DETAILED DESCRIPTION

Figure 1:
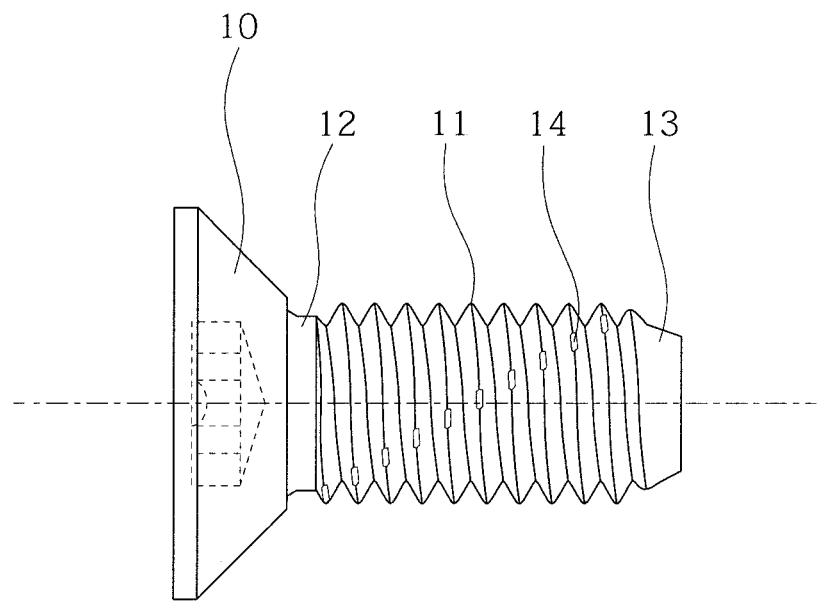
FIG. 1 is a front view of a bolt according to an embodiment.
Figure 2:
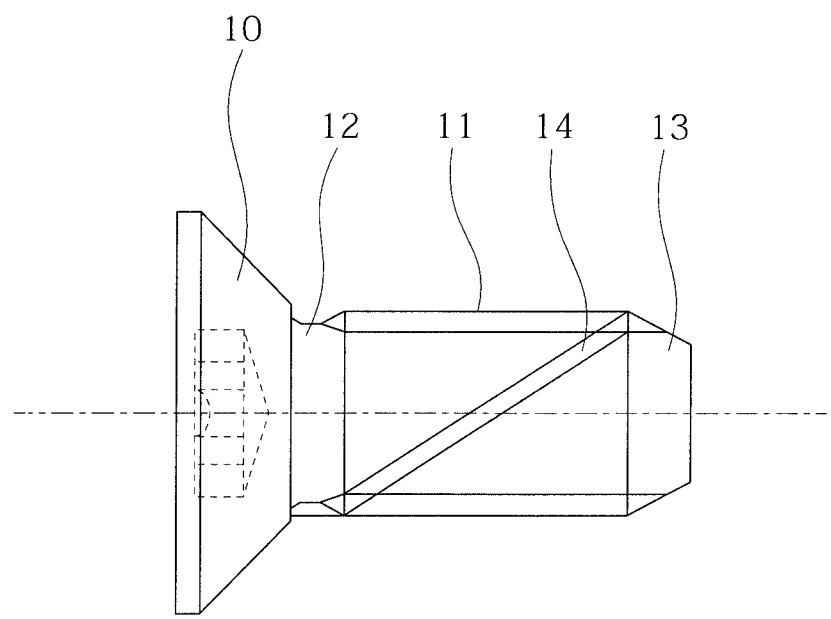
FIG. 2 is an explanatory view of the bolt according to the embodiment.

A preferred embodiment of the present invention will be shown below. FIG. 1 is a front view of a bolt according to an embodiment, and FIG. 2 is an explanatory view thereof. In these figures, 10 is a bolt head, and 11 is a regular threaded portion formed on a shaft thereof by a rolling method. The regular threaded portion 11 is formed over the entire length of the shaft except a lower neck portion 12 and a shaft tip 13. This bolt is a right-hand threaded bolt with the regular threaded portion 11 as a right-hand thread and moves forward when rotated to the right with respect to an internal thread. In this embodiment, the head 10 is formed with a recessed portion for receiving a tool, but the shape of the head 10 is arbitrary and may be a general hexagon. Further, the shape of the shaft tip 13 is not particularly limited.

A crushed portion 14 is formed on the ridge of the regular threaded portion 11. In the conventional locking bolt, the crushed portions 14 are usually formed in a plurality of threads on the shaft so as to be axisymmetric. In contrast to this, in the present invention, the crushed portion 14 is formed only in a single thread on the entire half-circumference of the regular threaded portion 11 so as to form a spiral shape that advances counterclockwise toward the shaft tip 13 when viewed from the head 10. Therefore, when the bolt of the present invention is viewed from the rear side of FIGS. 1 and 2, the crushed portion 14 cannot be seen. In order to manufacture such a bolt, a method may be used in which a section for forming the crushed portion 14 is provided only on one side of a pair of dies for rolling the bolt, and a blank is rolled while rotated 180 degrees between the dies. In this embodiment, the crushed portion 14 is formed over the entire length of the regular threaded portion 11, that is, over the entire half-circumference of the regular threaded portion.

Figure 3:
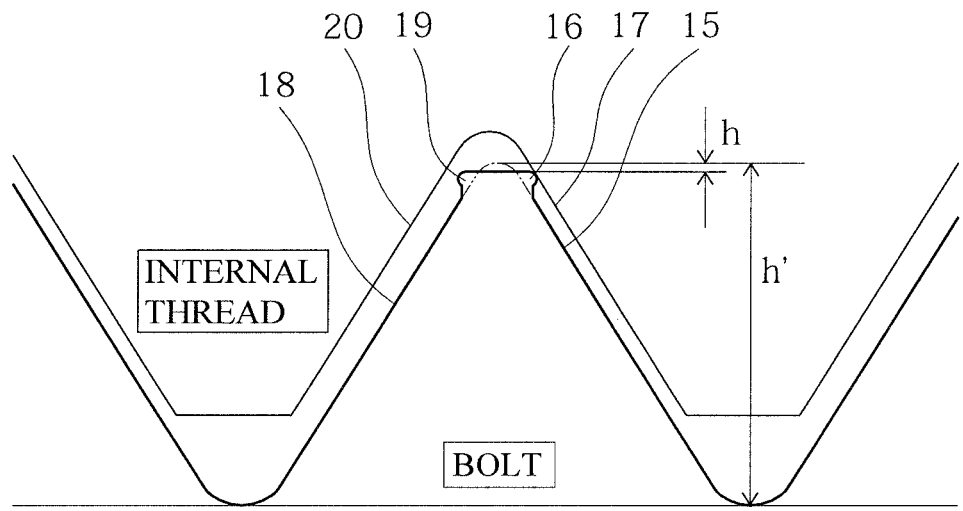
FIG. 3 is an enlarged cross-sectional view of a main part.
Figure 6:
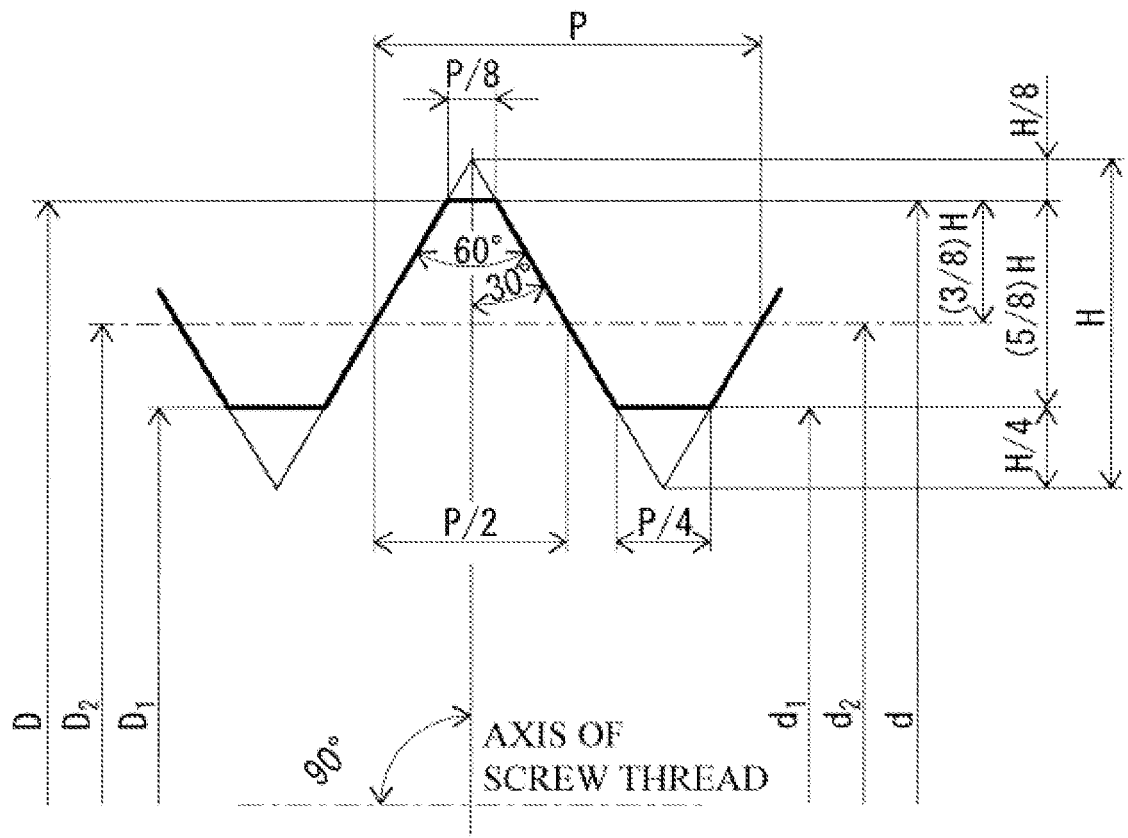
FIG. 6 is a drawing showing dimensions of ⅝H specified in JIS.

The crushed portion 14 is formed by crushing the top of the ridge as shown in FIG. 3. In the bolt of the present invention, a crushing amount h of the crushed portion 14 of the ridge is from 7 to 22.5% of a ridge height h' of the regular threaded portion, and the crushing amount is set to be much smaller than that of the conventional one. For example, Patent Literature 1 showing the prior art describes that the crushing amount is 0.474 mm in the case of an M8 coarse thread, which is about 8% of the outer diameter of an external thread. This is because there are two crushed portions on both sides, and the crushing amount of one crushed portion is 0.237 mm. According to JIS B 0205-1 (ISO 68-1), a thread height ⅝H of the M8 coarse thread at a pitch of 1.25 is 0.676582 mm, so that the crushing amount has been set to about 65% of the ridge height, and as compared to this, the crushing amount of the ridge according to the present invention is extremely small. In the drawing of JIS B 0205-1 General Purpose Metric Screw Threads: Basic Profile, the dimensions of ⅝H are specified as shown in FIG. 6.

As described above, in the present invention, since the crushing amount of the crushed portion 14 is reduced, when the bolt is screwed into an internal thread as shown in FIG. 3, only a bulge 16 formed on a clearance flank surface 15 of the bolt abuts against a clearance flank surface 17 of the internal thread, and a bulge 19 formed on a pressure flank surface 18 of the bolt does not abut against a pressure flank surface 20 of the internal thread. For this reason, unlike the conventional locking bolt, without increasing the screwing torque, it is possible to seat the bolt at a target torque in a section used at low torque. Even when the bolt is further tightened after being seated, the clearance flank surface 17 of the internal thread and the pressure flank surface 20 of the internal thread are not significantly damaged.

When the crushing amount of the crushed portion 14 of the ridge is 22.5% or more of the ridge height of the regular threaded portion, the bulges on the flank surfaces of the crushed portion interfere with the internal thread on both the pressure side and the clearance side. Therefore, a screwing torque is generated, which approaches the conventional locking bolt, and the advantages of the present invention are not fully exhibited. Further, when the crushing amount of the crushed portion 14 of the ridge is less than 7% of the ridge height of the regular threaded portion, the bolt approaches a normal bolt without a crushed portion, and the advantages of the present invention are not fully exhibited.

Next, a loosening prevention effect of this bolt will be described. In general, a bolt may loosen when subjected to vibration in a direction perpendicular to the axis. This is because the frictional force on the screw surface is small and the force due to vibration exceeds the frictional force. In order to prevent this loosening, the conventional locking bolt has obtained the same effect as when the frictional force on the screw surface is increased by crushing the ridge. Similarly, in the bolt of the present invention, when an axial force is generated after the bolt is seated, the pressure-side bulge formed on the top of the ridge slightly bites into the internal thread and the frictional force then increases.

Figure 4:
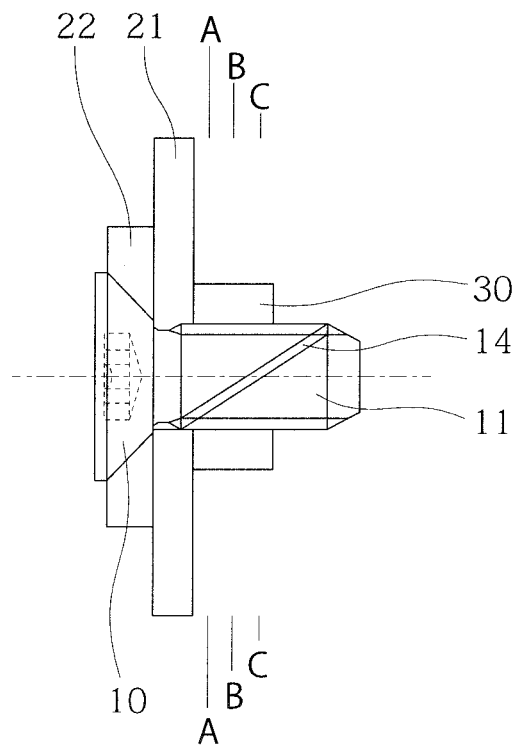
FIG. 4 is a cross-sectional view of a fastener used in an experiment.

Furthermore, the present inventor has confirmed through experiments that the bolt of the present invention does not loosen even when subjected to vibration, or rotates to the right, which is the tightening direction. Specifically, the bolt of the present invention was manufactured in the size of M8 (pitch 1.25 mm) specified in JIS, and two members 21 and 22 were fastened with a nut 30 as shown in FIG. 4. The tightening torque was 2 Nm. Vibration with an amplitude load of 3.6 kN was applied 40,000 times at 10 Hz to the member 22 in FIG. 4 in a direction perpendicular to the axial direction of the bolt. For comparison, a bolt of a comparative example in which a crushed portion was formed only in a single thread so as to form a spiral shape that advances clockwise toward the shaft tip 13 when viewed from the head, contrary to the present invention, and the test was conducted under the same conditions.

As a result, the bolts of the present invention did not loosen at all even when subjected to vibration, and some bolts rotated to the right, which was the tightening direction. In contrast to this, rotational loosening occurred in the bolt of the comparative example, and even if the tightening torque was increased, the rotational loosening could not be completely prevented.

According to this experiment, there has been confirmed that when the crushed portion 14 is formed so as to have a spiral shape that advances clockwise toward the shaft tip 13 when viewed from the head, the bolt tends to loosen, and when the crushed portion is formed so as to have a spiral shape that advances counterclockwise toward the shaft tip 13, a loosening prevention effect can be obtained, but the theoretical reason is still unclear. However, the present inventor has estimated as follows: since the bolt of the present invention has the crushed portion 14 formed on only one side, the bolt is slightly tilted in almost the opposite direction to the bulge on the flank surface by a force in the direction perpendicular to the axis of the bolt applied to the bolt head 10 when subjected to vibration from the member 22, such tilting continuously occurs from the bolt head in the fitting area toward the tip, and as a result, the bolt tilts counterclockwise when viewed from the head. At that time, the bolt falls so as to roll along the inside of the internal thread, so that the bolt rotates in the tightening direction.

Figure 5:
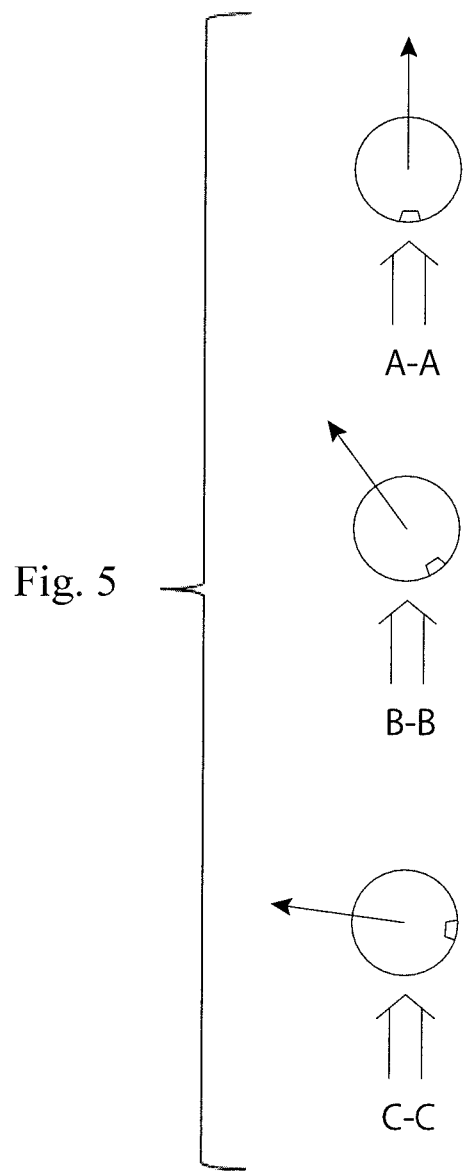
FIG. 5 are views showing tilting directions of the bolt at cross-sectional positions of A, B, and C in FIG. 4.

For reference, the tilting directions of the bolt at the three cross-sectional positions A, B, and C in FIG. 4 are indicated by arrows in FIG. 5. In the conventional locking bolt in which crushed portions with a plurality of threads are formed at axisymmetric positions, such tilts are canceled by the tilts due to the mutual threads, so that the same working effect as that of the present invention cannot be expected.

As described above, the bolt of the present invention can obtain a loosening prevention effect without increasing the screwing torque nor significantly damaging the flank surface of the internal thread.

Next, an experiment has been conducted to confirm a conductive effect of the bolt of the present invention. When parts that need to ensure conductivity are mounted in production lines of automobiles or the like, special bolts called earth bolts are used. The bolt of the present invention has a conductive effect such that since the crushed portion of the ridge strongly comes in contact with an internal thread, the crushed portion of the ridge and the internal thread rub against each other, making the resistance value stably low to an electric current, and can also be used as an earth bolt, as well as a locking bolt.

Figure 7:
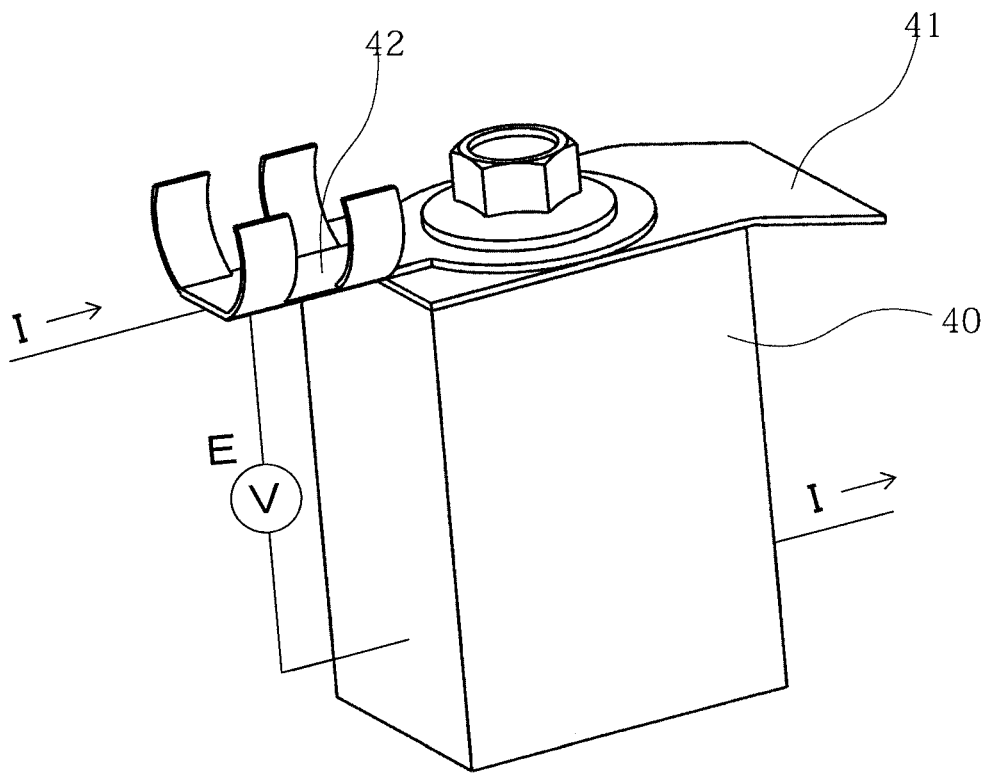
FIG. 7 is an explanatory view of an instrument used in a conductivity test.

As shown in FIG. 7, this experiment was conducted by a method in which an insulating sheet 41 was placed on an aluminum internal thread member 40, a copper terminal 42 was positioned thereon and fastened with the bolt of the present invention, an electric current was applied from the internal thread member 40 to a copper terminal 42, and an electric resistance value was then calculated from the voltage value. When the bolt is securely brought into metal touch with the internal thread member 40, the electric resistance value becomes low, and when the metal touch between the bolt and the internal thread member 40 is insufficient, the electric resistance value becomes unstable. The results are shown in FIG. 8.

Figure 8:
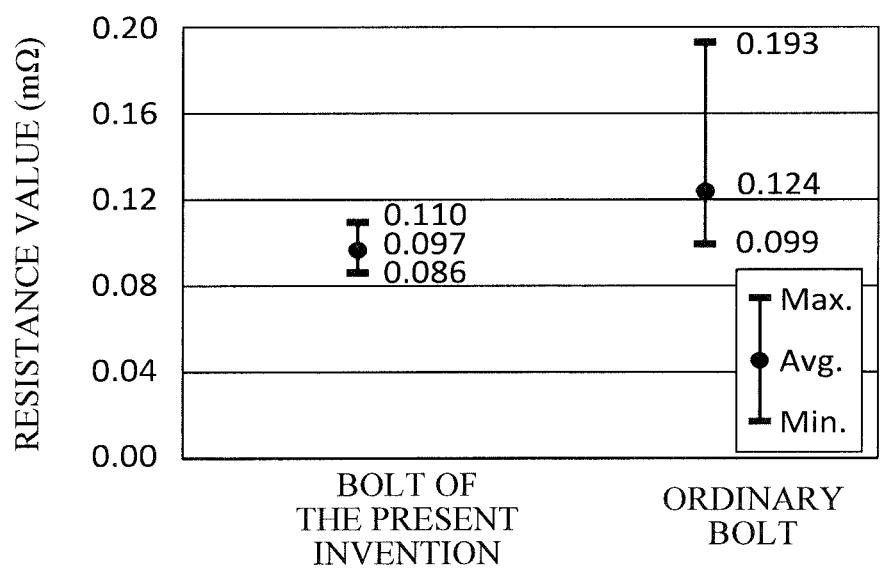
FIG. 8 is a graph showing the results of the conductivity test.

As shown in FIG. 8, when an ordinary bolt was used, the resistance value varied greatly between 0.099 mΩ and 0.193 mΩ, and the average value was as high as 0.124 mΩ, but when the bolt of the present invention was used, the resistance value was in the range of 0.089 mΩ to 0.110 mΩ, the variation was small, and the average value was as low as 0.097 mΩ. This experiment confirmed that the bolt of the present invention was able to be used as an earth bolt.

REFERENCE SIGNS LIST

10 Bolt head
11 Regular threaded portion
12 Lower neck portion
13 Shaft tip
14 Crushed portion
15 Clearance flank surface of bolt
16 Bulge
17 Clearance flank surface of internal thread
18 Pressure flank surface of bolt
19 Bulge
20 Pressure flank surface of internal thread
21 Member
22 Member
30 Nut
40 Aluminum internal thread member
41 Insulating sheet
42 Copper terminal

The invention claimed is:

1. A bolt engned with an internal thread having a crushed portion of a ridge formed on a regular threaded portion of the bolt, wherein
a crushing amount of the crushed portion of the ridge is from 7 to 22.5% of a ridge height of the regular threaded portion, the crushed portion of the ridge is set to have a height at which a screwing torque is not increased as the bolt is screwed into the internal thread, and the crushed portion of the ridge is formed on an entire half-circumference or a partial half-circumference of the regular threaded portion so as to form a spiral shape that advances toward a shaft tip in a direction opposite to the ridge of the regular threaded portion when viewed from a head, and
wherein the crushed portion of the ridge has a size such that as the bolt is screwed into the internal thread only a bulge of a clearance flank surface comes into contact with a flank surface of the internal thread.

2. The bolt according to claim 1, wherein the crushed portion of the ridge is formed only as a single spiral sbaRe.

3. The bolt according to claim 1, wherein the crushed portion of the ridge produces a loosening prevention effect or a conductive effect.

4. The bolt according to claim 2, wherein the crushed portion of the ridge produces a loosening prevention effect or a conductive effect.

* * * * *